United States Patent Office 2,716,142
Patented Aug. 23, 1955

2,716,142

PREPARATION OF VINYL FLUORIDE AND CATALYST THEREFOR

Benjamin F. Skiles, Wilmington, Del., assignor to E. I. du Pont de Nemours and Company, Wilmington, Del., a corporation of Delaware No Drawing. Application July 21, 1952,
Serial No. 300,125

12 Claims. (Cl. 260—653)

This invention relates to a method for preparing vinyl fluoride and to a novel and improved catalyst which is particularly adapted for use in the preparation of vinyl fluoride.

Vinyl fluoride is a valuable compound, particularly for the preparation of polymeric plastic materials and the like. It has been proposed to manufacture vinyl fluoride by reacting acetylene with hydrogen fluoride in the presence of mercury compounds as catalysts. Such mercury catalysts are expensive and relatively difficult to prepare, tend to be unstable, have short catalyst lives, give poor yields of products, and frequently exhibit long induction periods before the reaction begins. Also, in order to obtain vinyl fluoride as the predominant product, it is generally necessary to employ an excess of acetylene.

Hillyer et al., in Patent No. 2,471,525, disclose that aluminum trichloride and aluminum oxide are effective catalysts for such reaction and produce vinyl fluoride and 1,1-difluoroethane in substantially equal proportions. In Patent No. 2,574,480, Hillyer et al. disclose that a mixture of alumina and zinc fluoride is also an effective catalyst to produce vinyl fluoride and 1,1-difluoroethane in substantially equal molar ratios, but demonstrate by experiment that zinc fluoride alone, deposited on a graphite support, is not a catalyst for such reaction. Because vinyl fluoride is more valuable than 1,1-difluoroethane, it is desirable to provide a catalyst for the reaction which will give higher yields of vinyl fluoride and decrease the formation of 1,1-difluoroethane, so that vinyl fluoride is the predominant product.

It is an object of my invention to provide a novel and improved catalyst for producing vinyl fluoride. A particular object is to provide such a catalyst for the reaction of acetylene with hydrogen fluoride, whereby vinyl fluoride is the predominant product. Another object is to provide a process for preparing such a catalyst. A further object is to provide a method for reacting acetylene with hydrogen fluoride in the presence of such a catalyst whereby the yield of vinyl fluoride is markedly increased, the formation of 1,1-difluoroethane is decreased and vinyl fluoride is the predominant product. Other objects are to provide new compositions of matter and to advance the art. Still other objects will appear hereinafter.

The above and other objects may be accomplished in accordance with my invention which comprises preparing a novel catalyst from a restricted class ef zinc compounds, and employing such catalyst in the production of vinyl fluoride. The catalyst of my invention is prepared by heating a bed of particles of a zinc compound of the class consisting of zinc oxide, zinc nitrate and zinc sulfide to a temperature of from about 65° C. to about 200° C., flowing a gaseous mixture of HF and nitrogen through such bed of particles maintained at such temperatures until there is a material decrease in the rate in which the HF is removed from the gaseous mixture by said bed, and then discontinuing the flow of the gaseous mixture through the bed.

Such catalyst is employed in the production of vinyl fluoride by heating such catalyst bed to a temperature of from 250° C. to about 400° C.; flowing a gaseous mixture of HF and acetylene, in a proportion of from about 2 to about 5 mols of HF to each mol of acetylene, through such bed at a rate of from about 20 to about 80 volumes of acetylene per volume of particles per hour while maintaining the bed at a temperature of from 250° C. to about 400° C.; and separating vinyl fluoride from the gaseous mixture leaving the bed.

I have found that, by treating particles of zinc oxide, zinc nitrate and zinc sulfide with a gaseous mixture of HF and nitrogen under the conditions above set forth, products are obtained which are particularly valuable as catalysts for the reaction of acetylene with HF and which have the unusual and unpredictable property of markedly increasing the yield of vinyl fluoride from such reaction while decreasing the formation of 1,1-difluoroethane, whereby vinyl fluoride is the predominant product. Such catalysts are also effective for dehydrofluorinating 1,1-difluoroethane to produce high yields of vinyl fluoride. Such catalysts are easy and relatively cheap to make and have unusually long catalyst lives.

The particles of the zinc compounds of my invention, which are to be employed for producing the catalyst, may be in various forms. They may be in granular form produced by well known methods. They may be made by mixing an aqueous slurry of the zinc compound with a binder, such as sugar, drying, heating slowly in air to carbonize and burn out the sugar, and then breaking up the resulting porous mass to particles of the desired size. The particles may be in the form of pellets made by intimately mixing the zinc compound with a binder, such as graphite, pressing into the form of pellets, and subsequently heating the pellets slowly in air. Also, such particles may be made by depositing the zinc compound in well known manner on particles of a carbon support, such as charcoal and graphite. In accordance with well known principles, the particles should be sufficiently small to provide large surface areas for contact with the reactant gases, but ordinarily should not be so small as to unduly obstruct the passage of the gases therethrough or to be readily carried out of the reaction zone by the effluent gases. I have found particles of from about 3 mesh to about 12 mesh size to be quite satisfactory. The catalyst bed may be of the fluid bed type, if desired.

In order to produce catalysts of the desired character, it is essential to treat the particles of the zinc compounds with hydrogen fluoride at temperatures above 50° C. and usually in the range of from about 65° C. to about 200° C. Under such conditions, the HF rapidly combines with the zinc compounds until each 400 cc. of the particles contain from about 50 to about 100 grams of HF. The nature of the reactions taking place and of the products obtained have not been fully determined and are not completely understood. Part of the HF appears to be adsorbed on the particles since it can be removed therefrom by subjecting the product to a vacuum at room temperatures. However, most of the HF appears to be firmly bound to or reacted with the zinc compound. For example, when zinc oxide is so treated, some water appears in the effluent gases, indicating that some zinc fluoride may be formed, but it is not known whether all of the bound fluorine is present as zinc fluoride. Furthermore, analyses show that a substantial portion of the zinc compound is not converted to zinc fluoride. This is further confirmed by the fact that the product is an effective catalyst for the reaction of HF with acetylene, whereas it is known that zinc fluoride alone is not a catalyst for such reaction. It is possible that the catalytic activity of the product is due to some sort of complex or addition product of HF or $ZnF_2$ or both with the zinc compound, or is due to some mutual promoter action between ZnF₂ and the zinc compound.

Desirably, the HF is brought into contact with the particles of the zinc compound in admixture with nitrogen. The nitrogen is an inert gas and is employed to carry the HF into contact with the particles, to maintain a positive flow of gas through the reactor while the HF is being absorbed by the particles, and to carry any volatile reaction products out of the reactor. The amount of nitrogen employed is not critical. However, excessively large amounts of nitrogen have the disadvantage of unnecessarily prolonging the time required to produce the catalyst due to extreme dilution of the HF and to the capacity of the equipment. Generally speaking, the nitrogen should be in a proportion of from about 20 grams to about 100 grams per hour for each 400 cc. of the particles. I have found that roughly about 28 grams of nitrogen per hour per 400 cc. of particles is quite satisfactory and convenient.

The rate of flow of the hydrogen fluoride into the bed of particles should be at a rate such that the HF initially is substantially completely removed from the gaseous mixture by the bed of particles, and such flow continued until fumes of HF appear copiously in the gases passing out of the bed. While the HF may be passed into and through the bed of particles at a more rapid rate, such procedure is less desirable because it is then difficult to determine by direct observation when the preparation of the catalyst has been completed, and it is necessary to collect and recover the excess HF. Preferably, the HF is passed into the catalyst at the rate of from about 50 grams to about 100 grams per hour for each 400 cc. of the particles, in which case, the preparation of the catalyst is complete in from about 1 to about 2 hours. If the HF is passed into the bed of particles at a lower rate, the time required for preparing the catalyst will be unduly extended and, if the rate of flow of the HF is sufficiently small, it becomes difficult to determine by direct observation when the preparation of the catalyst has been completed.

In the use of such catalyst in the preparation of vinyl fluoride by the reaction of HF with acetylene, the bed of catalyst is heated to a temperature of from 250° C. to about 400° C., and such temperature is maintained while a gaseous mixture of HF and acetylene are passed through it. The gaseous mixture of HF and acetylene should contain the HF in a proportion of from about 2 to about 5 mols of HF to each mol of acetylene and, preferably, from about 2 to about 4 mols. Temperatures, materially below 250° C., result in uneconomically low conversions. Also, temperatures, materially above 400° C., result in reduced conversions and in carbonization. Optimum conversions and yields are obtained at temperatures of from about 300° C. to about 350° C., and such temperatures are preferred.

The mixture of HF and acetylene should be passed through the catalyst bed at a rate of from about 20 to about 80 volumes of acetylene per volume of particles per hour. Lower rates unduly reduce the capacity of the reactor and are uneconomical. Higher rates result in excessive amounts of unreacted acetylene in the effluent gases and render the process uneconomical due to the cost of separating and recovering such acetylene. Preferably, the rate of flow of the mixture through the catalyst is from about 25 to about 35 volumes of acetylene per volume of catalyst per hour.

Preferably, the reaction is carried out at atmospheric pressure. Elevated pressures may be used so long as the pressure is insufficiently high to liquefy either the reactants or the products. The practical upper limit is about 15 atmospheres.

The acetylene should be purified before employing it in the process. Preferably, it is purified by passing it through water and sodium bisulfite solution to remove any acetone or aldehyde impurities, through sodium hydroxide to remove any acidic impurities or sulfur dioxide from the bisulfite scrubber, through a solution of sodium hydrosulfite containing a catalytic amount of β-anthraquinone sodium sulfonate to remove oxygen, and then through a drying column of calcium chloride; and the acetylene, employed in the examples appearing hereinafter, was so purified.

The products of the reaction may be recovered in any conventional manner, such as by condensing the products and then fractionally distilling them to separate the components thereof. Preferably, the gases are passed through an alkali solution to remove excess HF, then dried over calcium chloride, and the gas then analyzed by the infrared method or condensed and fractionally distilled in a Podbielniak still. The infrared analysis is reasonably accurate for determining the amount of vinyl fluoride, but, when the gases contain large amounts of vinyl fluoride, such method of analysis gives only approximate values for 1,1-difluoroethane due to interference by vinyl fluoride. Any unreacted acetylene and HF may be returned to the reactor.

Any 1,1-difluoroethane, obtained by the reaction, may be passed through the catalyst of my invention at temperatures of from 250° C. to about 400° C., preferably, from about 300° C. to about 350° C., and at a rate of from about 20 to about 80 volumes per volume of catalyst per hour and, preferably, at the rate of from about 25 volumes to about 35 volumes. Under such conditions, the 1,1-difluoroethane is dehydrofluorinated to produce high yields of vinyl fluoride.

In order to more clearly illustrate my invention preferred modes of carrying the same into effect, and the advantageous results obtained thereby, examples are given hereinafter. In such examples, the reactor was a black iron pipe 1 inch in diameter and 33 inches long placed in a vertical position in an electric furnace 30 inches long. The bed of particles was supported on a stainless steel screen and covered by stainless steel wool. Such bed was about 30 inches long and positioned in the heated portion of the reactor. Except where otherwise expressly indicated, the bed was heated to a temperature in the range of 100° C. to 150° C. and a gaseous mixture of HF and nitrogen was flowed upward through it while maintaining the temperature in such range. The flow of the gaseous mixture into the bed was at the rate of from about 50 grams to about 100 grams per hour of HF and roughly about 28 grams per hour of nitrogen. Such flow of the mixture of HF and nitrogen was continued until the preparation of the catalyst was complete, as shown by the appearance of copious amounts of HF fumes in the gas leaving the reactor, whereupon the flow of such gaseous mixture into the reactor was discontinued. The acetylene was first purified by the preferred method hereinbefore described. The treatment of the zinc compounds with the mixture of nitrogen and HF and the processes employing the catalyst were all carried out at atmospheric pressure. The product mixtures, containing vinyl fluoride, were all purified by washing with aqueous alkali and drying before analysis by infrared or fractionation.

Example 1

A catalyst was prepared as follows: 500 g. of zinc oxide, 100 g. of cane sugar and 200 g. of water were thoroughly mixed to form a thick paste. This paste was dried and heated slowly to 700° C. in air to carbonize and burn out the sugar. The friable mass which resulted was broken up and screened. The 6–12 mesh particles were used. 400 cc. of the 6–12 mesh catalyst were placed in the reactor so that the catalyst zone was approximately all within the furnace. The temperature was adjusted to 150° C. A mixture of gaseous HF and nitrogen was then passed into the lower end of the reactor and through the catalyst until copious amounts of HF began to appear in the exit nitrogen stream at the top of the reactor. This required about 2 hours and about 100 grams of HF. The catalyst was then heated to 300° C. and a gaseous mixture, containing 1 mol of acetylene per 3 mols of HF, was passed through the tube at a rate of 30 volumes of acetylene per volume of catalyst per hour. The temperature was held at 300–325° C. during the experiment. The exit gases were scrubbed with a 5% sodium hydroxide solution to remove HF and then dried over calcium chloride and condensed in a receiver cooled with solid carbon dioxide. Fractionation of a sample of the product, taken after about 5 hours, showed it to have the following composition:

| | Percent |
|---|---|
| Vinyl fluoride | 67.7 |
| 1,1-difluoroethane | 23.7 |
| Acetylene | 8.6 |

Samples, taken at the ends of runs of 14 hours and 30 hours, showed 56% and 9%, respectively, of vinyl fluoride and approximately 11% and 1%, respectively, of 1,1-difluoroethane by infrared analysis.

*Example 2*

A slurry was prepared from 50 g. of finely-divided zinc oxide and 200 cc. of acetone. This was poured over 400 cc. of 6–12 mesh activated charcoal while stirring to get uniform distribution. The mass was dried under vacuum at 50° C. for 24 hours. 400 cc. of this product were then placed in the black iron reactor and a mixture of gaseous HF and nitrogen was passed through the tube at 150° C. until HF fumes appeared copiously in the exit nitrogen. This required about 1 hour. The catalyst was then heated to 250° C. and a gaseous mixture, consisting of acetylene and HF in the ratio of 2 mols of HF per mol of acetylene, was passed through the tube at a rate of 34 volumes of acetylene per volume of catalyst per hour. The temperature was held at 245–255° C. The exit gases were collected as in Example 1. The temperature was then increased to 300° C., and another gas sample was taken. This was repeated at 350° C. and 400° C. Infrared analyses of the samples gave the following results:

| Temperature, ° C. | Vinyl Fluoride, Percent | 1,1-Difluoro-ethane, Percent |
|---|---|---|
| 250 | 6 | 1 |
| 300 | 30 | 3 |
| 350 | 30 | 2 |
| 400 | 14 | trace |

*Example 3*

Finely powdered zinc oxide was intimately mixed with 10% of its weight of flake graphite, pressed into pellets of about ¼ inch diameter, and then heated at 700° C. for 2 hours. 400 cc. of these pellets were put into the iron reactor and a gaseous mixture of HF and nitrogen was passed through at 150° C. until HF fumes began to appear copiously in the exit nitrogen. This required about 2 hours. The catalyst was then heated to 330° C. and a gaseous mixture of HF and acetylene, in a molar ratio of 4:1, was passed through at a rate of 25 volumes of acetylene per volume of catalyst per hour. The product gases were treated as in Example 1. Samples were taken at the ends of runs of various lengths of time and analyzed with the following results:

| Hours Run | Percent Vinyl Fluoride | Percent 1,1-Difluoro-ethane | Method of Analysis |
|---|---|---|---|
| 4 | 65.6 | 21.0 | Fractionation. |
| 28 | 23.0 | 4.0 | Do. |
| 40 | 18.0 | 2.0 | Infrared. |
| 48 | 27.0 | 3.0 | Do. |
| 66 | 20.0 | 3.0 | Do. |

Samples of the catalyst were taken after runs of 3 hours and 66 hours, subjected to vacuum at room temperature to remove adsorbed HF, and then analyzed for zinc and fluorine with the following results:

| Sample | Percent Zn | Percent F |
|---|---|---|
| 3-hour sample | 65.35 | 26.04 |
| 66-hour sample | 58.20 | 29.50 |
| Theory for ZnF$_2$ | 63.23 | 36.77 |

While it appears that some of the fluorine is combined as ZnF$_2$, it is not known how much of it is so combined and how much is combined in other ways. However, it is apparent that a substantial portion of the zinc oxide is not converted to ZnF$_2$.

*Example 4*

242 g. of Zn(NO$_3$)$_2$.6H$_2$O were melted and poured over 400 cc. of 6–12 mesh activated charcoal while stirring to get uniform distribution. The mass was dried at 100° C. under vacuum. 400 cc. of tthe product were put into the iron reactor and a gaseous mixture of nitrogen and HF was passed through for about 1.5 hours at 65° C., at which time HF fumes appeared copiously in the exit nitrogen stream. The catalyst was then heated to 325° C. while a gaseous mixture of HF and acetylene, in molar ratio of 2:1, was passed through at a rate of 25 volumes of acetylene per volume of catalyst per hour. The exit gases were treated as in Example 1. The run was continued for 43 hours, with samples being taken at various times and analyzed. The results were as follows:

| Hours Run | Percent Vinyl Fluoride | Percent 1,1-Difluoro-ethane | Method of Analysis |
|---|---|---|---|
| 5 | 41.2 | 49.5 | Fractionation. |
| 20 | 38.0 | 18.1 | Do. |
| 31 | 30.0 | 7.0 | Infrared. |
| 43 | 12.3 | 0.0 | Fractionation. |

*Example 5*

50 g. of zinc sulfide were suspended in about 200 cc. of water and poured onto 400 cc. of 6–12 mesh activated charcoal while stirring to get a uniform distribution. The mass was dried under vacuum at 100° C. for 24 hours. 400 cc. of this were put into the reactor and a gaseous mixture of HF and nitrogen was passed through at 100° C. until HF fumes appeared copiously in the exit nitrogen. A gaseous mixture of HF and acetylene, in a molar ratio of 3:1, was passed through the reactor at 290° C. and 350° C. at a rate of 24 volumes of acetylene per volume of catalyst per hour. The products were collected as before. Samples, taken after 5 hours and analyzed by infrared, showed:

| Temperature | Vinyl Fluoride Percent | 1,1-Difluoro-ethane Percent |
|---|---|---|
| 290° C | 14 | 1 |
| 350° C | 24 | 2 |

*Example 6*

400 cc. of the granular zinc oxide, prepared as in Example 1, were put into the iron reactor and a gaseous mixture of HF and nitrogen was passed through the tube at 90–100° C. for about 1 hour. A total of 78 g. of HF were used. The flow of HF and nitrogen was stopped and the catalyst was heated to 350° C. Gaseous 1,1-difluoroethane was then passed through at a rate of 36 volumes per volume of catalyst per hour (42 g. per hour). There was only a small amount of HF in the outlet stream during the first 2 hours, then copious amounts of HF fumes appeared in the exit gas. At this point, the product was condensed, after removal of HF by scrubbing with alkali as before, and fractionally distilled. The product contained 28.9% vinyl fluoride and 71.1% unconverted 1,1-difluoroethane.

When the above experiment was repeated without pretreating the zinc oxide with HF, no HF fumes were observed in the effluent gas until the catalyst was heated to nearly 400° C. At 400° C., there was a slight evolution of HF and a sample was condensed and fractionated. Such sample contained 1.4% of vinyl fluoride and 98.6% of 1,1-difluoroethane.

*Example 7*

A catalyst was prepared by pouring 200 g. of molten zinc chloride over 400 cc. of 6–12 mesh activated charcoal while stirring to get uniform distribution. The product was put into the iron reactor, and a gaseous mixture of nitrogen and HF was passed through for 1 hour, as in Examples 1 to 5, until copious fumes of HF were observed in the exit nitrogen. The catalyst was heated to 310–315° C. while a gaseous mixture of HF and acetylene, in a molar ratio of 2:1, was passed through at a rate of 24 volumes of acetylene per volume of catalyst per hour for 3 hours. The product gases were collected as before and analyzed by fractionation. They had the following composition:

| | Percent |
|---|---|
| Vinyl fluoride | 4.4 |
| 1,1-defluoroethane | 32.6 |
| Acetylene | 63.0 |

*Example 8*

A solution of 200 g. of $ZnSO_4 \cdot 7H_2O$ in 75 cc. of water was poured over 400 cc. of 6–12 mesh activated charcoal with stirring. The mass was dried at 400° C., then placed in the iron reactor and treated with a mixture of HF and nitrogen as in Examples 1 to 5. A gaseous mixture of HF and acetylene, in a molar ratio of 3:1, was passed through at a rate of 25 volumes of acetylene per volume of catalyst per hour while maintaining the temperature at 330° C. to 350° C. Fractional distillations, on liquid samples caught after 5 hours and 20 hours, yielded only traces of vinyl fluoride and 1,1-difluoroethane.

*Example 9*

400 cc. of 6–12 mesh granulated zinc phosphate were placed in the reactor and treated with a mixture of HF and nitrogen as in Examples 1 to 5. A gaseous mixture of HF and acetylene, in a molar ratio of 3:1, was passed through at a rate of 25 volumes of acetylene per volume of catalyst per hour while maintaining the temperature at about 330° C. Samples, caught after 5 hours and 16 hours, analyzed about 0.4% and 0.1% of 1,1-difluoroethane but no analyzable amounts of vinyl fluoride.

*Example 10*

Cadmium oxide was prepared by precipitation from a cadmium chloride solution with ammonia. The precipitate was filtered out and dried at 300° C. 400 cc. of such cadmium oxide was placed in the iron reactor and treated with a mixture of HF and nitrogen as in Examples 1 to 5. A gaseous mixture of HF and acetylene, in a molar ratio of 3:1, was passed through at a rate of 25 volumes of acetylene per volume of catalyst per hour while maintaining the temperature at 340° C. A sample of the product, taken at the end of 4.5 hours, showed 0.1% of vinyl fluoride and approximately 0.7% of 1,1-difluoroethane by infrared analysis.

Examples 7, 8, 9 and 10 are included solely for purposes of comparison, and show that zinc compounds, outside the scope of my invention, and oxides of other metals, e. g. cadmium oxide, do not produce the same results as the zinc compounds of my invention and are not equivalents thereof.

It will be understood that the preceding examples have been given for illustrative purposes solely and that my invention is not to be limited to the specific embodiments shown therein, but that many variations and modifications can be made within the scope of the general disclosure and without departing from the spirit or scope of my invention. The size of the reactor may be widely varied and other types of reactors may be employed in place thereof. The proportions, temperatures, pressures, rates of flow, proportions of reactants and the like may be widely varied as indicated in the general description.

From the preceding description and examples, it will be apparent that I have provided new catalysts which have novel and unexpected properties, a novel method for producing the same, and a novel and advantageous method for preparing vinyl fluoride. The catalysts are easy and relatively cheap to manufacture and have a long catalyst life. Their use in the manufacture of vinyl fluoride unexpectedly results in high yields of vinyl fluoride with decrease in the less valuable 1,1-difluoroethane. Therefore, it is apparent that my invention constitutes a valuable contribution to and advance in the art.

I claim:

1. A catalyst which consists essentially of the reaction product of HF with particles of a zinc compound of the class consisting of zinc oxide, zinc nitrate and zinc sulfide, obtained by passing a gaseous mixture of HF and nitrogen through a bed of the particles of the zinc compound at a temperature of from about 65° C. to about 200° C. at a rate of from about 50 grams to about 100 grams of HF per hour per 400 cc. of the particles until fumes of HF appear copiously in the gases passing out of the bed of particles and then discontinuing the flow of the gaseous mixture through the bed.

2. A catalyst which consists essentially of the reaction product of HF with particles of zinc oxide obtained by passing a gaseous mixture of HF and nitrogen through a bed of the particles of the zinc oxide at a temperature of from about 65° C. to about 200° C. at a rate of from about 50 grams to about 100 grams of HF per hour per 400 cc. of the particles until fumes of HF appear copiously in the gases passing out of the bed of particles and then discontinuing the flow of the gaseous mixture through the bed.

3. The process which comprises heating a bed of particles of a zinc compound of the class consisting of zinc oxide, zinc nitrate and zinc sulfide to a temperature of from about 65° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, and then discontinuing the flow of the gaseous mixture through the bed.

4. The process which comprises heating a bed of particles of a zinc compound of the class consisting of zinc oxide, zinc nitrate and zinc sulfide to a temperature of from about 65° C. to about 200° C., flowing a gaseous mixture of HF and nitrogen through such bed of particles at a rate of from about 50 grams to about 100 grams of HF per hour per 400 cc. of the particles and such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, and then discontinuing the flow of the gaseous mixture through the bed.

5. The process which comprises heating a bed of particles of zinc oxide to a temperature of from about 65° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, and then discontinuing the flow of the gaseous mixture through the bed.

6. The process which comprises heating a bed of particles of zinc oxide to a temperature of from about 65° C. to about 200° C., flowing a gaseous mixture of HF and nitrogen through such bed of particles at a rate of from about 50 grams to about 100 grams of HF per hour per 400 cc. of the particles and such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, and then discontinuing the flow of the gaseous mixture through the bed.

7. The process which comprises heating a bed of particles of a zinc compound of the class consisting of zinc oxide, zinc nitrate and zinc sulfide to a temperature of from about 65° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, then discontinuing the flow of the gaseous mixture through the bed, then heating the bed of particles to a temperature of from 250° C. to about 400° C. and flowing a gaseous mixture of HF and acetylene in a proportion of from about 2 to about 5 mols of HF to each mol of acetylene through such bed at a rate of from about 20 to about 80 volumes of acetylene per volume of particles per hour while maintaining the bed at a temperature of from 250° C. to about 400° C., and separating vinyl fluoride from the gaseous mixture leaving the bed.

8. The process which comprises heating a bed of particles of zinc oxide to a temperature of from about 65° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, then discontinuing the flow of the gaseous mixture through the bed, then heating the bed of particles to a temperature of from 250° C. to about 400° C. and flowing a gaseous mixture of HF and acetylene in a proportion of from about 2 to about 5 mols of HF to each mol of acetylene through such bed at a rate of from about 20 to about 80 volumes of acetylene per volume of particles per hour while maintaining the bed at a temperature of from 250° C. to about 400° C., and separating vinyl fluoride from the gaseous mixture leaving the bed.

9. The process which comprises heating a bed of particles of a zinc compound of the class consisting of zinc oxide, zinc nitrate and zinc sulfide to a temperature of from about 65° C. to about 200° C., flowing a gaseous mixture of HF and nitrogen through such bed of particles at a rate such that the HF initially is substantially completely removed from the gaseous mixture by the bed of particles, continuing the flow of the gaseous mixture through the bed while maintaining the bed at a temperature of from about 65° C. to about 200° C. until fumes of HF appear copiously in the gases passing out of the bed, then discontinuing the flow of the gaseous mixture through the bed, then heating the bed of particles to a temperature of from about 300° C. to about 350° C. and flowing a gaseous mixture of HF and acetylene in a proportion of from about 2 to about 5 mols of HF to each mol of acetylene through such bed at a rate of from about 25 to about 35 volumes of acetylene per volume of particles per hour while maintaining the bed at a temperature of from about 300° C. to about 350° C., and separating vinyl fluoride from the gaseous mixture leaving the bed.

10. The process which comprises heating a bed of particles of zinc oxide to a temperature of from about 65° C. to about 200° C., flowing a gaseous mixture of HF and nitrogen through such bed of particles at a rate such that the HF initially is substantially completely removed from the gaseous mixture by the bed particles, continuing the flow of the gaseous mixture through the bed while maintaining the bed at a temperature of from about 65° C. to about 200° C. until fumes of HF appear copiously in the gases passing out of the bed, then discontinuing the flow of the gaseous mixture through the bed, then heating the bed of particles to a temperature of from about 300° C. to about 350° C. and flowing a gaseous mixture of HF and acetylene in a proportion of from about 2 to about 5 mols of HF to each mol of acetylene through such bed at a rate of from about 25 to about 35 volumes of acetylene per volume of particles per hour while maintaining the bed at a temperature of from about 300° C. to about 350° C., and separating vinyl fluoride from the gaseous mixture leaving the bed.

11. A catalyst which consists essentially of the reaction product of HF with particles of zinc nitrate obtained by passing a gaseous mixture of HF and nitrogen through a bed of the particles of the zinc nitrate at a temperature of from about 65° C. to about 200° C. at a rate of from about 50 grams to about 100 grams of HF per hour per 400 cc. of the particles until fumes of HF appear copiously in the gases passing out of the bed of particles and then discontinuing the flow of the gaseous mixture through the bed.

12. A catalyst which consists essentially of the reaction product of HF with particles of zinc sulfide obtained by passing a gaseous mixture of HF and nitrogen through a bed of the particles of the zinc sulfide at a temperature of from about 65° C. to about 200° C. at a rate of from about 50 grams to about 100 grams of HF per hour per 400 cc. of the particles until fumes of HF appear copiously in the gases passing out of the bed of particles and then discontinuing the flow of the gaseous mixture through the bed.

References Cited in the file of this patent

UNITED STATES PATENTS

| | | |
|---|---|---|
| 2,205,411 | Howard | June 25, 1940 |
| 2,382,260 | Schaad | Aug. 14, 1945 |
| 2,574,480 | Hillyer et al. | Nov. 13, 1951 |

OTHER REFERENCES

Mellor, J. W., "Treatise on Inorganic Chemistry," vol. 4, pages 533–4 (1923 edition).